(12) United States Patent
Tomiya et al.

(10) Patent No.: US 7,934,324 B2
(45) Date of Patent: May 3, 2011

(54) LINEAR SCALE

(75) Inventors: Masaki Tomiya, Zushi (JP); Hiroaki Kawada, Yokohama (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 12/729,565

(22) Filed: Mar. 23, 2010

(65) Prior Publication Data

US 2010/0242295 A1  Sep. 30, 2010

(30) Foreign Application Priority Data

Mar. 24, 2009  (JP) ................... 2009-071525

(51) Int. Cl.
*G01D 5/347* (2006.01)
*G01B 21/06* (2006.01)

(52) U.S. Cl. ............................... 33/706; 33/702

(58) Field of Classification Search ............ 33/702, 33/703, 704, 706, 707, 708
See application file for complete search history.

(56) References Cited

U.S. PATENT DOCUMENTS

| | | | | |
|---|---|---|---|---|
| 5,131,166 A | * | 7/1992 | Weber | 33/832 |
| 5,511,321 A | * | 4/1996 | Nelle | 33/704 |
| 2001/0037580 A1 | * | 11/2001 | Tondorf | 33/706 |
| 2007/0137059 A1 | * | 6/2007 | Holzapfel et al. | 33/706 |
| 2007/0240325 A1 | * | 10/2007 | Pelsue et al. | 33/707 |
| 2009/0271998 A1 | * | 11/2009 | Carlen et al. | 33/706 |
| 2010/0165309 A1 | * | 7/2010 | Kamiyama et al. | 33/706 |

FOREIGN PATENT DOCUMENTS

JP   2007-183254   7/2007

* cited by examiner

*Primary Examiner* — G. Bradley Bennett
(74) *Attorney, Agent, or Firm* — Rankin, Hill & Clark LLP

(57) ABSTRACT

A linear scale that is used for displacement measurement is provided. The linear scale includes a scale board, a graduation unit, and an attachment unit. The scale board is made of low expansion ceramics. The graduation unit is fixed to an upper surface of the scale board. The graduation unit is read at the time of measurement. The attachment unit is a unit for attaching the scale board to a base member.

8 Claims, 6 Drawing Sheets

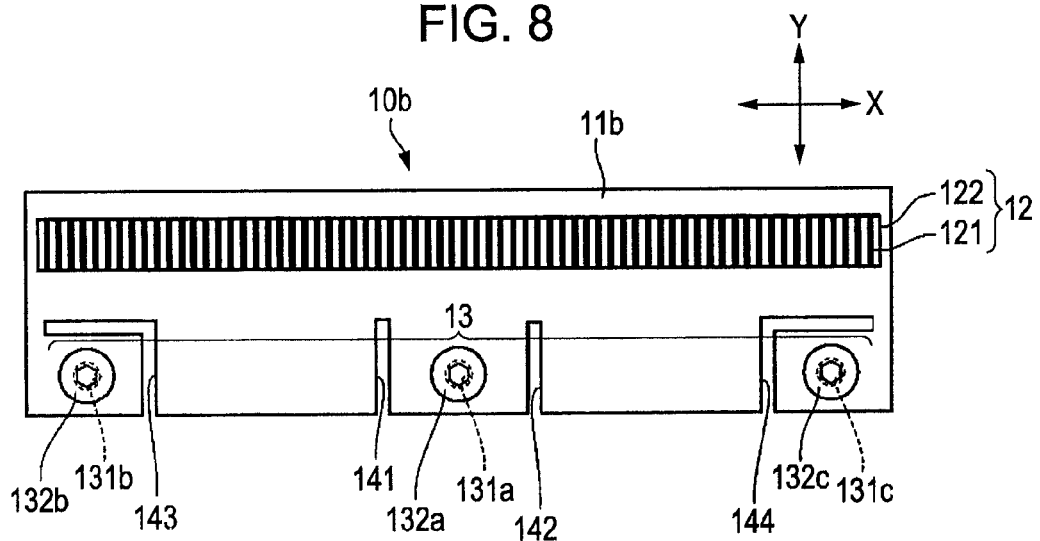
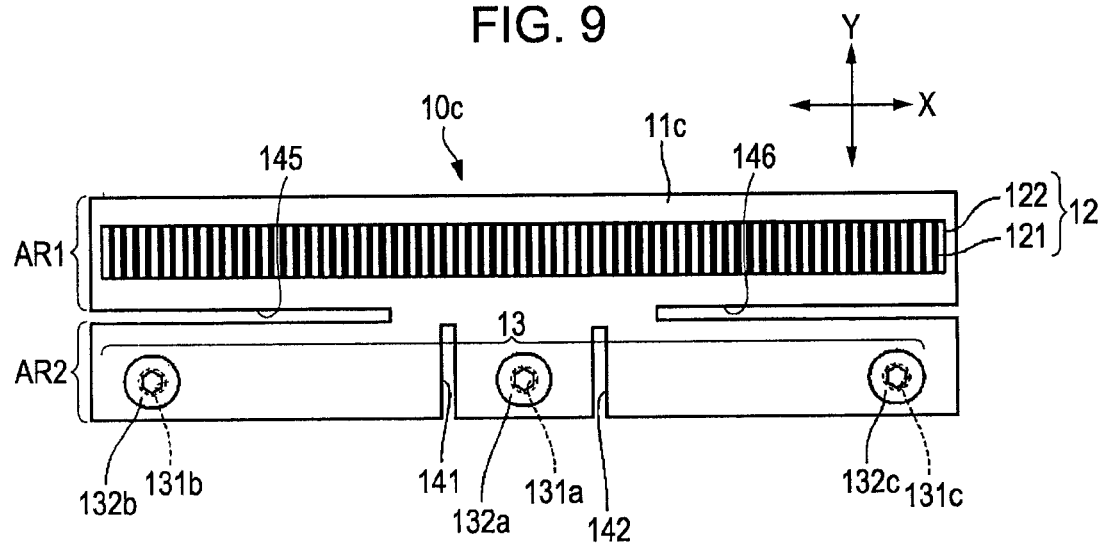

LINEAR SCALE

BACKGROUND OF THE INVENTION

1. Field of the Invention

The present invention relates to a linear scale that is used for displacement measurement.

2. Description of the Related Art

A detector that reads graduation and a graduated scale are used for displacement measurement in the art. The scale is typically provided with a scale table and graduations. The scale table is made of glass or ferrous metal. The graduations are formed on the upper surface of the scale table. Therefore, a change in the form of the scale table has a negative influence upon measurement accuracy. For example, the dimension of the scale may change with time due to stress strain caused by thermal stress applied for a short time or stress release for a long time.

For example, a scale disclosed in Japanese Unexamined Patent Application Publication No. 2007-183254 has been proposed to address the above problems. The scale disclosed in the above patent document is provided with a holder under the scale table (i.e., scale plate). The holder can be mounted on a predetermined surface. The holder fixes the scale table at a Bessel point by means of an elastic adhesive. That is, in the structure of the scale disclosed in the above patent document, the holder absorbs a change in the form of the scale table.

However, the structure disclosed in the above patent document has a disadvantage in that it requires the holder. In addition, it is necessary to determine a fixation place with high positional accuracy. Therefore, it is disadvantageous in terms of manufacturing cost.

SUMMARY OF THE INVENTION

An advantage of some aspects of the invention is to provide a linear scale that is capable of performing measurement with a high degree of accuracy while achieving production at low cost.

A linear scale according to an aspect of the invention, which is used for displacement measurement, includes: a scale board that is made of low expansion ceramics; a graduation unit that is fixed to an upper surface of the scale board, the graduation unit being read at the time of measurement; and an attachment unit that attaches the scale board to a base member.

BRIEF DESCRIPTION OF THE DRAWINGS

FIG. 8 is a top view that schematically illustrates an example of the structure of a linear scale according to a third embodiment of the invention;

FIG. 9 is a top view that schematically illustrates an example of the structure of a linear scale according to a fourth embodiment of the invention;

DESCRIPTION OF THE PREFERRED EMBODIMENTS

With reference to the accompanying drawings, exemplary embodiments of the present invention will now be explained in detail.

First Embodiment

Structure of Linear Scale According to First Embodiment

Figure 1:
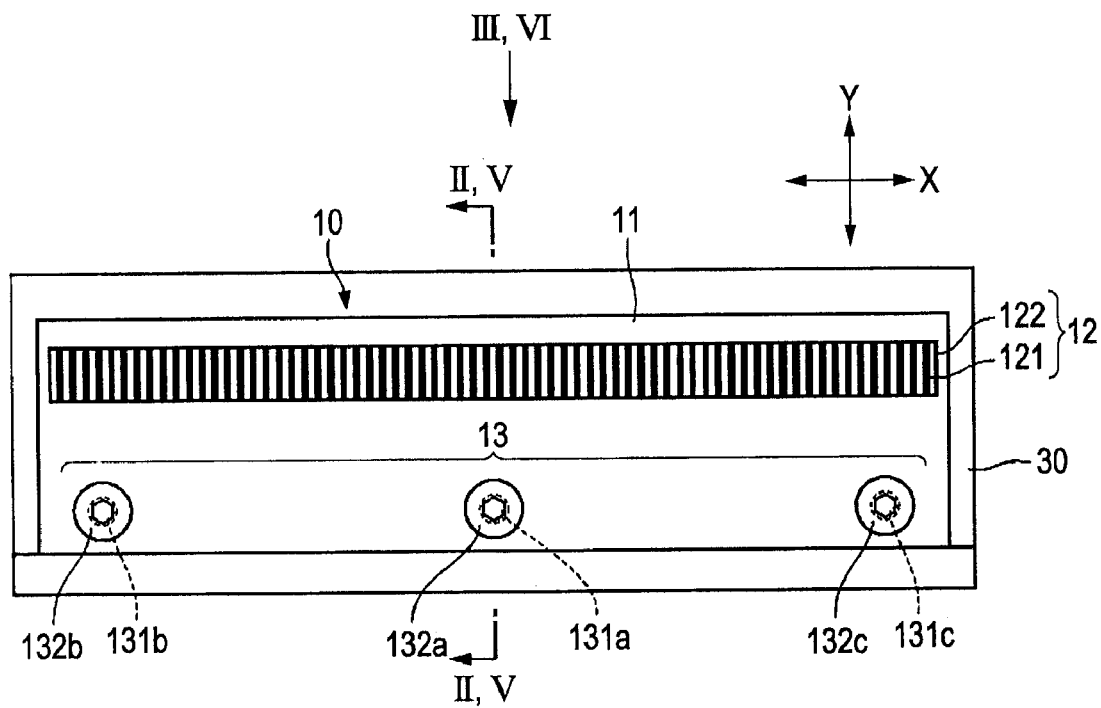
FIG. 1 is a top view that schematically illustrates an example of the structure of a linear scale according to an exemplary embodiment of the invention.
Figure 2:
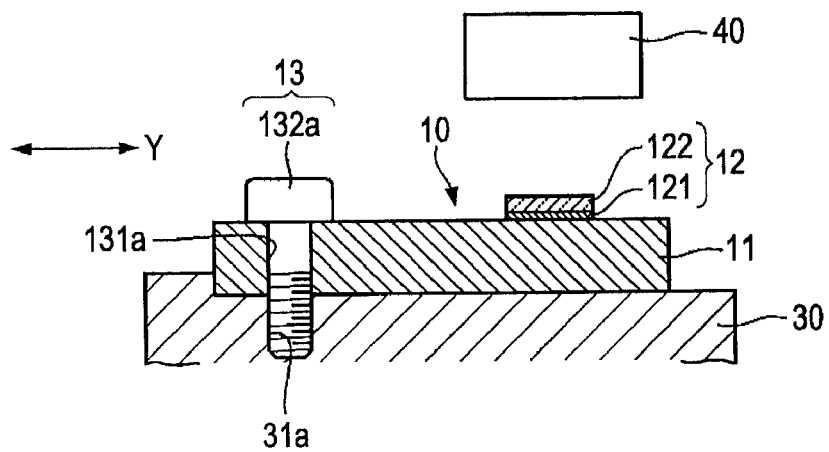
FIG. 2 is a sectional view taken along the line II-II of FIG. 1.
Figure 3:
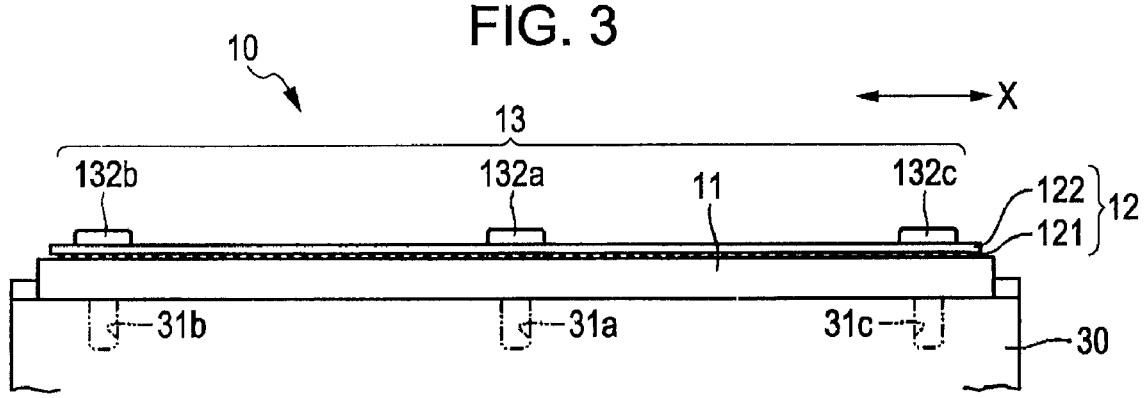
FIG. 3 is an arrow view that illustrates a linear scale according to the embodiment of the invention that is viewed from the arrow direction III of FIG. 1.

The structure of a linear scale 10 according to a first embodiment of the invention is explained first with reference to FIGS. 1, 2, and 3. FIG. 1 is a top view that schematically illustrates an example of the structure of the linear scale 10. FIG. 2 is a sectional view taken along the line II-II of FIG. 1. FIG. 3 is an arrow view that illustrates the linear scale 10 viewed from the arrow direction III of FIG. 1.

The linear scale 10 is used for displacement measurement. Specifically, the linear scale 10 is used for a photoelectric reflective linear encoder. As illustrated in FIG. 1, the linear scale 10 is provided with a scale table 11, a graduation part 12, and an attachment part 13.

As illustrated in FIGS. 1, 2, and 3, the scale table 11 has the shape of a substantially rectangular parallelepiped. In the following description, the direction of the long sides of the scale table 11 is referred to as the X direction. The direction of the short sides of the scale table 11 is hereinafter referred to as the Y direction The X direction is the direction in which the linear scale 10 moves relative to a detector 40 at the time of measurement.

The scale table 11 is made of low expansion ceramics. It is preferable that the low expansion ceramics should have a thermal expansion coefficient α of 0.01 to 0.04 ppm/K. For example, oxide ceramics that contains only solid solution crystal made of Li—Mg—Al—Fe—Si—O element can be used. More specifically, a preferred example of the low expansion ceramics is low expansion ceramics manufactured by Nippon Steel Materials Co., Ltd. (trade name: NEX-CERA), which contains $Mg_aLi_bFe_cAl_dSi_eO_f$ (a: 1.8 to 1.9, b: 0.1 to 0.3, c: 0 to 0.2, d: 3.9 to 4.1, e: 6.0 to 7.0, f: 19 to 23) and has a thermal expansion coefficient α of 0.02 ppm/K. The low expansion ceramics may have the same crystal structure as α-Cordierite in addition to the solid solution to give a greater rigidity. The comparable rigidity of the low expansion ceramics is preferably 50 Gpa/g/cm$^3$ or greater.

As illustrated in FIG. 1, the graduation part 12 is fixed to the scale table 11 at a position relatively close to one edge of the scale table 11 viewed in the Y direction. The graduation part 12 extends in the X direction as illustrated in FIG. 3 (and FIG. 1). The detector 40 reads the graduation part 12 at the time of measurement. The graduation part 12 includes graduations 121, which are read at the time of measurement, and a substrate 122 on which the graduations 121 are formed.

The graduations 121 are bonded to the upper surface of the scale table 11. The graduations 121 constitute a stripe pattern that includes a plurality of graduation lines arranged with a predetermined pitch in the X direction. The graduations 121 are amplitude grating that is used for detection by a detector that utilizes a tri-grating principle or phase grating that is used for detection by a detector that uses a diffraction optical system.

The substrate 122 is provided on the upper surface of the graduations 121. The substrate 122 is made of a transparent material such as glass. Accordingly, a beam of light that is used for measurement can pass through the substrate 122. The substrate 122 has the shape of an elongated rectangle. The substrate 122 is elongated in the X direction.

As illustrated in FIGS. 1, 2, and 3, the attachment part 13 has a structure for fastening the scale table 11 to a base member 30. The attachment part 13 is provided relatively close to the other edge of the scale table 11 viewed in the Y direction. The attachment part 13 includes through holes 131a, 131b, and 131c and screws 132a, 132b, and 132c.

The through holes 131a, 131b, and 131c are formed through the scale table 11. The through holes 131a, 131b, and 131c are formed relatively close to the other edge of the scale table 11 viewed in the Y direction. The through holes 131a, 131b, and 131c are aligned in the X direction. The through hole 131a is formed at the X-directional center of the scale table 11, that is, a halfway position in the X direction. The through holes 131b and 131c are formed near respective edges of the scale table 11 viewed in the X direction. The screws 132a, 132b, and 132c are fitted in threaded holes 31a, 31b, and 31c, which are formed in the base member 30, through the through holes 131a, 131b, and 131c, respectively.

Method for Manufacturing Linear Scale According to First Embodiment

Figure 4:
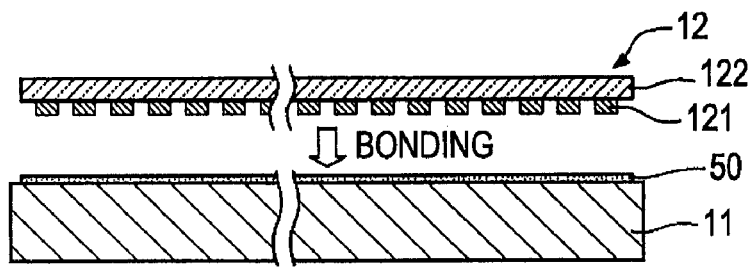
FIG. 4 is a diagram that schematically illustrates an example of a manufacturing step of a linear scale according to the embodiment of the invention.

Next, with reference to FIG. 4, a method for manufacturing the linear scale 10 according to the first embodiment of the invention is explained below. As a first step, as illustrated in FIG. 4, the graduations 121 are formed on the lower surface of the substrate 122. Next, the lower surface of the graduations 121 is bonded to the upper surface of the scale table 11. An adhesive 50, for example, a silicone adhesive (KE44T, Manufactured by Shin-Etsu Chemical Co., Ltd.), is used for the attachment of the graduations 121 to the scale table 11. The adhesion strengthens the mechanical combination of the graduations 121 and the scale table 11.

Advantageous Effects Produced by Linear Scale According to First Embodiment

In the structure of the linear scale 10 according to the first embodiment of the invention, since the scale table 11 is made of low expansion ceramics that is far less susceptible to aged deterioration in comparison with other material such as glass, almost no aged deterioration occurs in the graduation part 12, which is fixed securely to the scale table 11. For this reason, it is possible to perform measurement with a high degree of accuracy. In addition, in the structure of the linear scale 10 according to the first embodiment of the invention, since the scale table 11 is directly fastened to the base member 30 by means of the attachment part 13 (which includes the through holes 131a, 131b, and 131c and the screws 132a, 132b, and 132c), it is not necessary to provide a holder or the like that holds the scale table 11. Therefore, the linear scale 10 according to the first embodiment of the invention has a simple structure and can be manufactured at low cost.

In the first embodiment, the substrate 122 is provided on the upper surface of the graduations 121. Therefore, the linear scale 10 according to the first embodiment of the invention has an advantage that it is possible to protect the graduations 121 from physical shock by means of the substrate 122.

Second Embodiment

Structure of Linear Scale According to Second Embodiment

Figure 5:
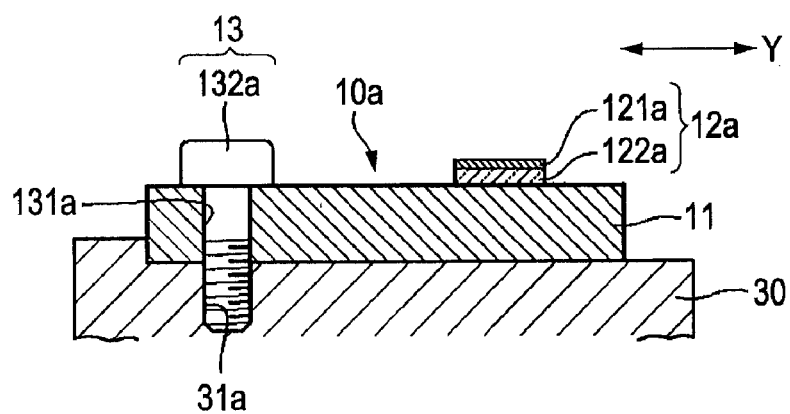
FIG. 5 is a sectional view that schematically illustrates an example of the structure of a linear scale according to a second embodiment of the invention that is taken along the line V-V of FIG. 1.
Figure 6:
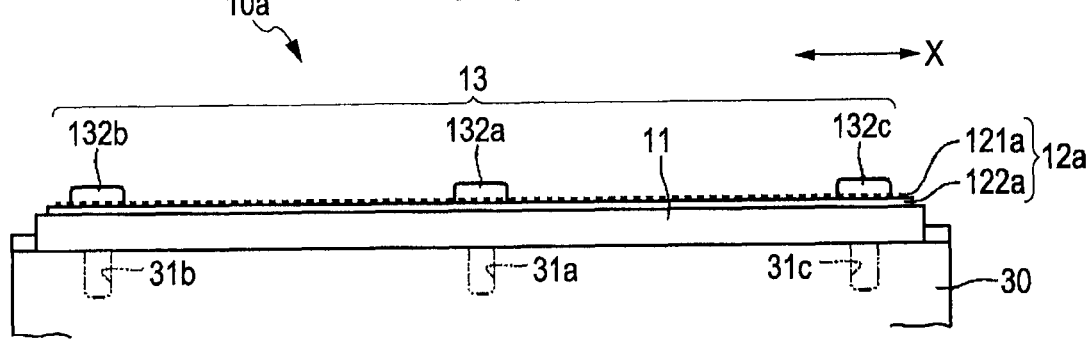
FIG. 6 is an arrow view that illustrates a linear scale according to the second embodiment of the invention that is viewed from the arrow direction VI of FIG. 1.

Next, with reference to FIGS. 5 and 6, the structure of a linear scale 10a according to a second embodiment of the invention is explained below. FIG. 5 is a sectional view that schematically illustrates an example of the structure of the linear scale 10a according to the second embodiment of the invention, which is taken along the line V-V. FIG. 6 is an arrow view that illustrates the linear scale 10a viewed from the arrow direction VI. In the following description of the linear scale 10a according to the second embodiment of the invention, the same reference numerals are consistently used for the same components as those of the linear scale 10 according to the first embodiment of the invention so as to omit any redundant explanation.

The linear scale 10a according to the second embodiment of the invention is different from the linear scale 10 according to the first embodiment of the invention in that, as illustrated in FIGS. 5 and 6, graduations 121a of a graduation part 12a are formed on the upper surface of a substrate 122a thereof. The linear scale 10a can be used for an optical-type reflective linear encoder like the first embodiment of the invention. Besides such application, the linear scale 10a may be used for a capacitance-type reflective linear encoder or an electromagnetic-induction reflective linear encoder.

The graduations 121a of the linear scale 10a are amplitude grating that is used for detection by a detector that utilizes a tri-grating principle or phase grating that is used for detection by a detector that uses a diffraction optical system like the first embodiment of the invention. The graduations 121a may be a random pattern that is used for detection by a capacitance detector or an electromagnetic induction detector.

The substrate 122a of the graduation part 12a is bonded to the upper surface of the scale table 11. The substrate 122a is a printed circuit board (PCB) that is made of, for example, ferrous metal, glass epoxy, or the like.

Method for Manufacturing Linear Scale According to Second Embodiment

Figure 7:
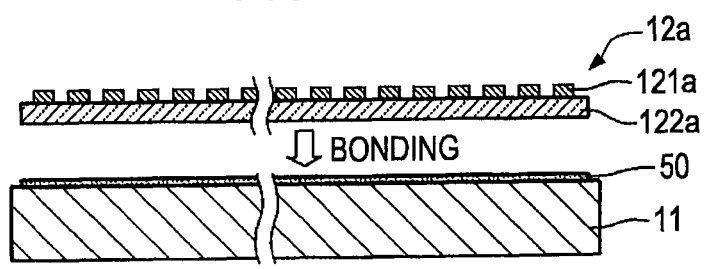
FIG. 7 is a diagram that schematically illustrates an example of a manufacturing step of a linear scale according to the second embodiment of the invention.

Next, with reference to FIG. 7, a method for manufacturing the linear scale 10a according to the second embodiment of the invention is explained below. As a first step, as illustrated in FIG. 7, the graduations 121a are formed on the upper surface of the substrate 122a. Next, as illustrated therein, the lower surface of the substrate 122a is bonded to the upper surface of the scale table 11 by means of the adhesive 50.

Advantageous Effects Produced by Linear Scale According to Second Embodiment

The rigidity of the scale table 11 is far greater than that of the substrate 122a. For this reason, since the precision of the scale table 11 determines its mechanical precision, the linear scale 10a according to the second embodiment of the invention produces the same advantageous effects as those of the first embodiment of the invention. In addition, since the graduations 121a are formed on the upper surface of the substrate 122a opposite the bonding surface thereof, the linear scale 10a can be used for a capacitance-type reflective linear encoder or an electromagnetic-induction reflective linear encoder.

Third Embodiment

Structure of Linear Scale According to Third Embodiment

Next, with reference to FIG. 8, the structure of a linear scale 10b according to a third embodiment of the invention is explained below. FIG. 8 is a top view that schematically illustrates an example of the structure of the linear scale 10b. In the following description of the linear scale 10b according to the third embodiment of the invention, the same reference numerals are consistently used for the same components as those of the linear scale 10 according to the first embodiment of the invention and the linear scale 10a according to the second embodiment of the invention so as to omit any redundant explanation.

As illustrated in FIG. 8, the linear scale 10b according to the third embodiment of the invention has four slits 141, 142, 143, and 144 that are formed in the scale table 11.

Each of two slits 141 and 142 formed in the scale table 11 is a straight slit that extends in the Y direction from one edge face closer to the attachment part 13 to a region near a halfway point in the Y direction. These two slits 141 and 142 extend in the neighborhood of the through hole 131a. The through hole 131a is formed between the slit 141 and the slit 142.

Each of two slits 143 and 144 formed in the scale table 11 is an L-shaped slit that extends from the one edge face closer to the attachment part 13 in a bent slit pattern resembling a letter L. The slit 143 "encloses" the through hole 131b. The slit 144 encloses the through hole 131c.

Advantageous Effects Produced by Linear Scale According to Third Embodiment

Since the linear scale 10b according to the third embodiment of the invention has the slits 141, 142, 143, and 144 formed in the scale table 11, even in a case where the scale table 11 changes in form due to linear expansion, the slits 141, 142, 143, and 144 can absorb deformation due to the change in form of the scale table 11 and thereby prevent the deformation from affecting the graduation part 12. Having the slits 141, 142, 143, and 144, the linear scale 10b according to the third embodiment of the invention makes it possible to perform measurement with a higher degree of accuracy in comparison with the first and second embodiments of the invention.

Fourth Embodiment

Structure of Linear Scale According to Fourth Embodiment

Next, with reference to FIG. 9, the structure of a linear scale 10c according to a fourth embodiment of the invention is explained below. FIG. 9 is a top view that schematically illustrates an example of the structure of the linear scale 10c. In the following description of the linear scale 10c according to the fourth embodiment of the invention, the same reference numerals are consistently used for the same components as those of the linear scales 10, 10a, and 10b according to the first, the second, and the third embodiments of the invention so as to omit any redundant explanation.

As illustrated in FIG. 9, besides the two straight slits 141 and 142, the linear scale 10c according to the fourth embodiment of the invention has two straight slits 145 and 146 as a substitute for the two L-shaped slits 143 and 144 of the linear scale 10b according to the third embodiment of the invention.

The straight slits 145 and 146 extend in the X direction from the respective X-directional edges toward a region near a halfway point of a scale table 11c.

In the structure of the linear scale 10c according to the fourth embodiment of the invention, the two slits 145 and 146 separates, not completely but partially, the entire area of the scale table 11c into two areas, which are a first area AR1 and a second area AR2. The first area AR1 is located at one edge side of the scale table 11c viewed in the Y direction. The second area AR2 is located at the other edge side thereof.

Advantageous Effects Produced by Linear Scale According to Fourth Embodiment

Since the two slits 145 and 146, which are formed between the first area AR1 and the second area AR2, partially separates the entire area of the scale table 11c, the linear scale 10c according to the fourth embodiment of the invention produces the following advantageous effect besides the foregoing advantageous effects. Even in a case where the base member 30 changes in form, the slits 145 and 146 can absorb deformation and thereby prevent the deformation from affecting the graduation part 12. Having the slits 145 and 146, the linear scale 10c according to the fourth embodiment of the invention makes it possible to perform measurement with a higher degree of accuracy in comparison with the third embodiment of the invention.

Fifth Embodiment

Structure of Linear Scale According to Fifth Embodiment

Figure 10:
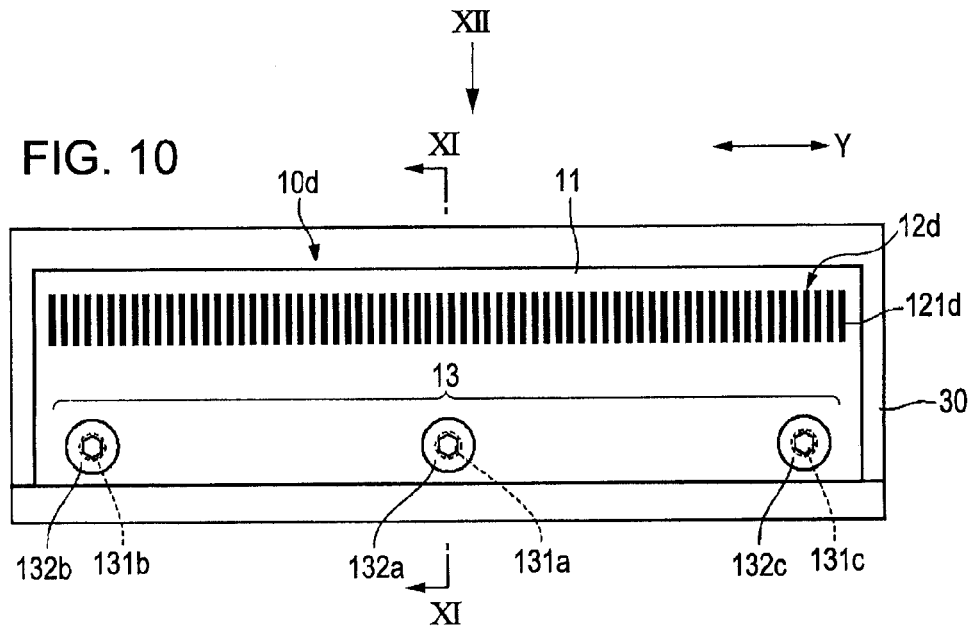
FIG. 10 is a top view that schematically illustrates an example of the structure of a linear scale according to a fifth embodiment of the invention.
Figure 11:
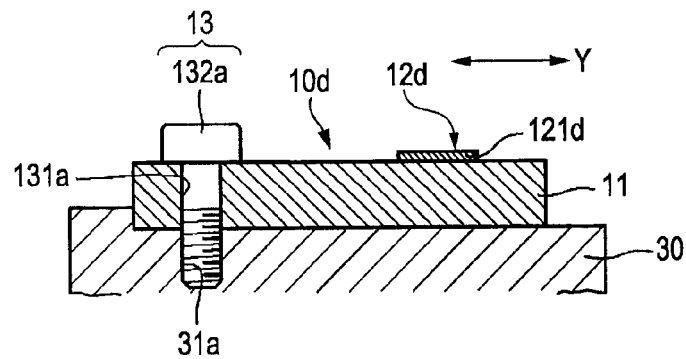
FIG. 11 is a sectional view that schematically illustrates an example of the structure of a linear scale according to the fifth embodiment of the invention that is taken along the line XI-XI of FIG. 10.
Figure 12:
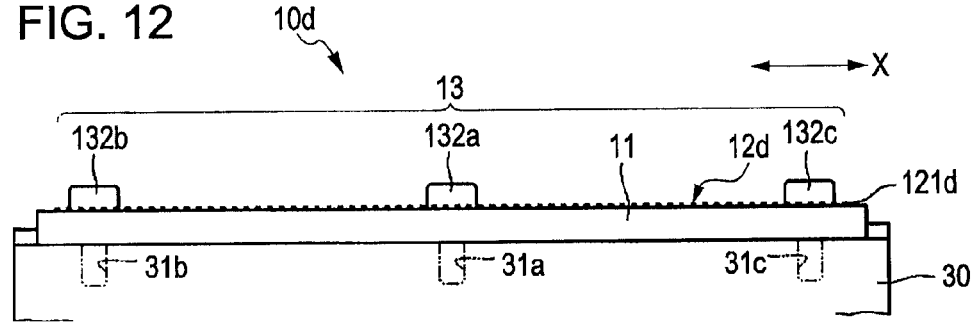
FIG. 12 is an arrow view that illustrates a linear scale according to the fifth embodiment of the invention that is viewed from the arrow direction XII of FIG. 10.

Next, with reference to FIGS. 10, 11, and 12, the structure of a linear scale 10d according to a fifth embodiment of the invention is explained below. FIG. 10 is a top view that schematically illustrates an example of the structure of the linear scale 10d. FIG. 11 is a sectional view taken along the line XI-XI of FIG. 10. FIG. 12 is an arrow view that illustrates the linear scale 10d viewed from the arrow direction XII-XII of FIG. 10. In the following description of the linear scale 10d according to the fifth embodiment of the invention, the same reference numerals are consistently used for the same components as those of the linear scales 10, 10a, 10b, and 10c according to the first, the second, the third, and the fourth embodiments of the invention so as to omit any redundant explanation.

The linear scale 10d according to the fifth embodiment of the invention is different from the linear scale according to the foregoing embodiments of the invention in that, as illustrated in FIGS. 10, 11, and 12, a graduation part 12d includes graduations 121d only. The linear scale 10d is used for, for example, a photoelectric reflective linear encoder. The linear scale 10d may be used for a capacitance-type reflective linear encoder or an electromagnetic-induction reflective linear encoder.

The graduations 121d are formed directly on the upper surface of the scale table 11. The graduations 121d are amplitude grating that is used for detection by a detector that utilizes a tri-grating principle or phase grating that is used for detection by a detector that uses a diffraction optical system. The graduations 121d may be a random pattern that is used for detection by a capacitance detector or an electromagnetic induction detector.

Advantageous Effects Produced by Linear Scale According to Fifth Embodiment

Since the graduations 121d are formed directly on the upper surface of the scale table 11, the linear scale 10d according to the fifth embodiment of the invention offers an advantage in that the graduations 121d are less likely to be affected by aged deterioration in comparison with the graduations 121, 121a formed on the substrate 122, 122a, which is made of, for example, glass, iron, or the like (the first embodiment, the second embodiment). That is, the linear scale 10*d* according to the fifth embodiment of the invention makes possible to perform measurement with a higher degree of accuracy in comparison with the first and second embodiments of the invention.

Sixth Embodiment

Structure of Linear Scale According to Sixth Embodiment

Figure 13:
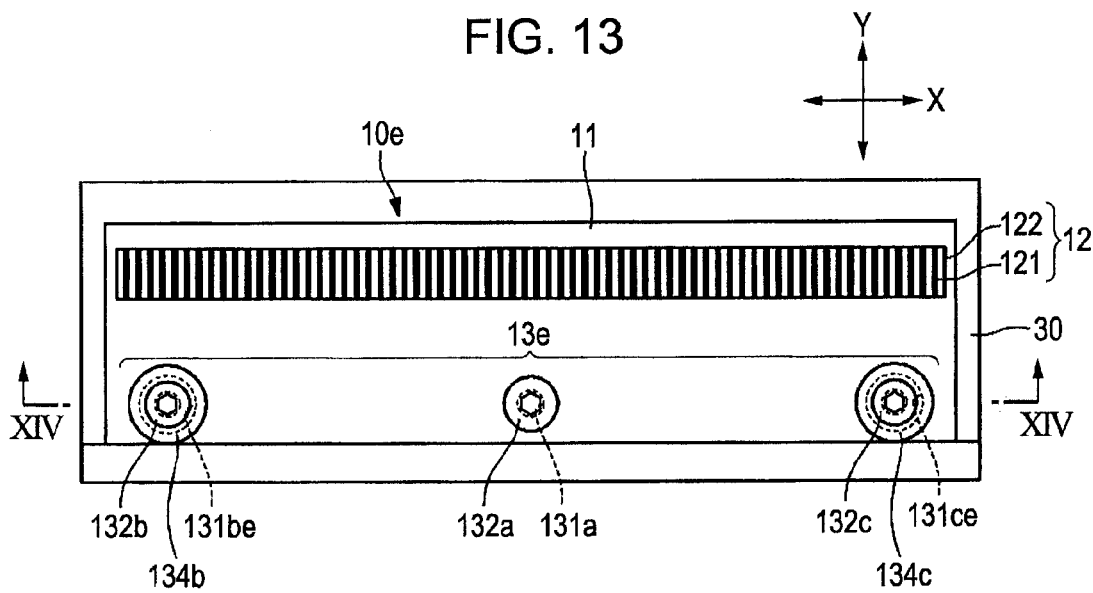
FIG. 13 is a top view that schematically illustrates an example of the structure of a linear scale according to a sixth embodiment of the invention.
Figure 14:
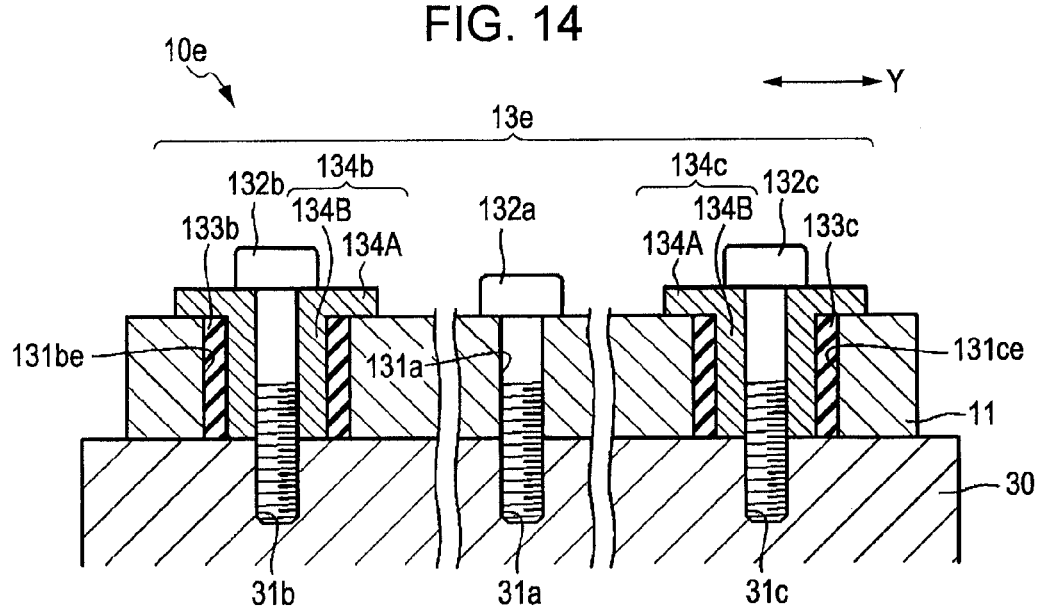
FIG. 14 is a sectional view taken along the line XIV-XIV of FIG. 13.

Next, with reference to FIGS. 13 and 14, the structure of a linear scale 10*e* according to a sixth embodiment of the invention is explained below. FIG. 13 is a top view that schematically illustrates an example of the structure of the linear scale 10*e*. FIG. 14 is a sectional view taken along the line XIV-XIV of FIG. 13. In the following description of the linear scale 10*e* according to the sixth embodiment of the invention, the same reference numerals are consistently used for the same components as those of the linear scales 10, 10*a*, 10*b*, 10*c*, and 10*d* according to the first, the second, the third, the fourth, and the fifth embodiments of the invention so as to omit any redundant explanation.

In the structure of the linear scale 10*e* according to the sixth embodiment of the invention, as illustrated in FIGS. 13 and 14, an attachment part 13*e* includes through holes 131*be* and 131*ce* as a substitute for the through holes 131*b* and 131*c* of the first embodiment of the invention. The diameter of the through hole 131*be*, 131*ce* is larger than that of the through hole 131*b*, 131*c*. In addition, the attachment part 13*e* includes an elastic member 133*b* and a bush 134*b* inside the through hole 131*be* and further includes an elastic member 133*c* and a bush 134*c* inside the through hole 131*ce*.

Each of the elastic members 133*b* and 133*c* is made of resin that has a predetermined modulus of elasticity. An example of the resin is silicon rubber. Each of the elastic members 133*b* and 133*c* has the shape of a ring. The elastic members 133*b* and 133*c* are fitted in the through holes 131*be* and 131*ce*, respectively.

The bushes 134*b* and 134*c* are fitted in the elastic members 133*b* and 133*c*, respectively. Each of the bushes 134*b* and 134*c* has an upper part 134A and a lower part 134B. The upper part 134A has a first outside diameter. The lower part 134B has a second outside diameter. The first outside diameter of the upper part 134A is larger than the diameter of the through hole 131*be*, 131*ce* of the scale table 11. The second outside diameter of the lower part 134B is substantially equal to the inner diameter of the elastic member 133*b*, 133*c*. The screws 132*b* and 132*c* are fitted in the threaded holes 31*b* and 31*c*, which are formed in the base member 30, through the bushes 134*b* and 134*c*, respectively.

Advantageous Effects Produced by Linear Scale According to Sixth Embodiment

In the structure of the linear scale 10*e* according to the sixth embodiment of the invention, the scale table 11 is fastened to the base member 30 by means of the screws 132*b* and 132*c* respectively through the through holes 131*be* and 131*ce*, the elastic members 133*b* and 133*c*, and the bushes 134*b* and 134*c*. Therefore, even in a case where the scale table 11 changes in form due to linear expansion, the elastic members 133*b* and 133*c* can absorb deformation due to the change in form of the scale table 11 and thereby prevent the deformation from affecting the graduation part 12. Thus, the linear scale 10*e* according to the sixth embodiment of the invention, which is provided with the elastic members 133*b* and 133*c* and the bushes 134*b* and 134*c*, makes it possible to perform measurement with a higher degree of accuracy in comparison with the first embodiment of the invention.

Variations

Although exemplary embodiments of the present invention are described above, needless to say, the invention is not restricted to the exemplary embodiments described herein; the invention can be implemented in a variety of variations, modifications, additions, or the like without departing from the gist, the spirit, and the scope thereof.

As explained in detail above, a linear scale that is capable of performing measurement with a high degree of accuracy while achieving production at low cost is provided.

What is claimed is:

1. A linear scale that is used for displacement measurement, comprising:
    a scale board that is made of low expansion ceramics;
    a graduation unit that is fixed to an upper surface of the scale board, the graduation unit being read at the time of measurement; and
    an attachment unit that attaches the scale board to a base member.

2. The linear scale according to claim 1, wherein the low expansion ceramics is oxide ceramics that contains only solid solution crystal made of Li—Mg—Al—Fe—Si—O element.

3. The linear scale according to claim 1, wherein the scale board has a slit that is formed near the attachment unit.

4. The linear scale according to claim 2, wherein the scale board has a slit that is formed near the attachment unit.

5. The linear scale according to claim 3, wherein the scale board has a first area located at one edge side of the scale board and a second area located at the other edge side of the scale board; the graduation unit is provided at the first area; the attachment unit is provided at the second area; and the slit is formed between the first area and the second area.

6. The linear scale according to claim 4, wherein the scale board has a first area located at one edge side of the scale board and a second area located at the other edge side of the scale board; the graduation unit is provided at the first area; the attachment unit is provided at the second area; and the slit is formed between the first area and the second area.

7. The linear scale according to claim 1, wherein the attachment unit includes a through hole that is formed through the scale board and a screw that is fitted in a threaded hole through the through hole; and the threaded hole is formed in the base member.

8. The linear scale according to claim 1, wherein the attachment unit includes a through hole that is formed through the scale board, an elastic member that is ring-shaped and fitted in the through hole, a bush that is fitted in the elastic member, and a screw that is fitted in a threaded hole through the bush; and the threaded hole is formed in the base member.

* * * * *